United States Patent [19]

Nakazawa et al.

[11] Patent Number: 5,736,278
[45] Date of Patent: Apr. 7, 1998

[54] COLOR FILTER HAVING LIGHT SCREENING RESIN LAYER AND FILTER RESIN LAYER

[75] Inventors: Koichiro Nakazawa, Tokyo; Katsuhiro Shirota, Kawasaki; Takeshi Miyazaki, Ebina; Akihiko Yamada, Yokohama, all of Japan

[73] Assignee: Canon Kabushiki Kaisha, Tokyo, Japan

[21] Appl. No.: 667,836

[22] Filed: Jun. 20, 1996

[30] Foreign Application Priority Data

Jun. 20, 1995 [JP] Japan ................................. 7-153268
Jun. 20, 1995 [JP] Japan ................................. 7-153269

[51] Int. Cl.$^6$ ............................. G02B 5/20; G02F 1/1335
[52] U.S. Cl. .................. 430/7; 430/321; 349/106; 349/110; 347/106; 427/492; 427/493; 427/511; 427/164
[58] Field of Search .................. 430/7, 321; 349/106, 349/110; 427/492, 493, 511, 164, 553, 559

[56] References Cited

U.S. PATENT DOCUMENTS 4,701,837  10/1987  Sakaki et al. .................. 346/135.1
5,552,192  9/1996  Kashiwazaki et al. .................. 427/492
5,593,757  1/1997  Kashiwazaki et al. .................. 428/195

FOREIGN PATENT DOCUMENTS 0655647   5/1995   European Pat. Off. .
61-245106 10/1986  Japan .
01217302  8/1989   Japan .
5-173010  7/1993   Japan .
5-288913  11/1993  Japan .
06265713  9/1994   Japan .

OTHER PUBLICATIONS

Abstract of JP 61-077014, "Manufacture of Color Filter", Yoshiaki et al. (Apr. 1986).

Primary Examiner—John A. McPherson
Attorney, Agent, or Firm—Fitzpatrick, Cella, Harper & Scinto

[57] ABSTRACT

Disclosed herein is a color filter comprising a transparent base, and a light-screening resin layer, in which numbers of transparent areas and light-screening areas formed at margins of the transparent areas are arranged, and a filter resin layer, in which a plurality of transparent colored areas different in spectral characteristics from each other is repeatedly arranged in opposed relation to the transparent areas of the light-screening resin layer, successively formed on the transparent base.

13 Claims, 5 Drawing Sheets

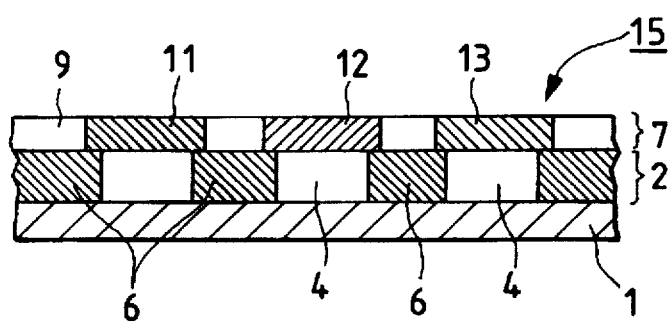
FIG. 4A
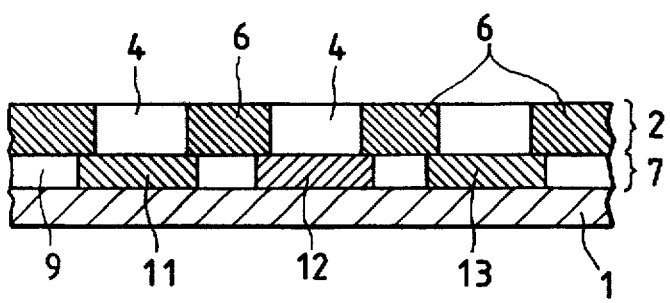
FIG. 4B
FIG. 5
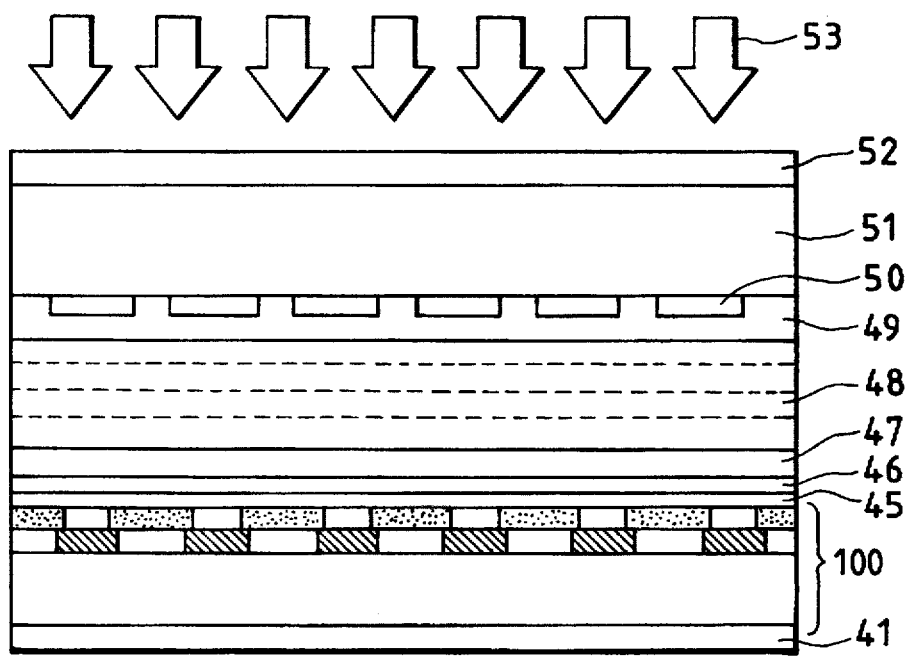

COLOR FILTER HAVING LIGHT SCREENING RESIN LAYER AND FILTER RESIN LAYER

BACKGROUND OF THE INVENTION

1. Field of the Invention

The present invention relates to a substrate having light-screening areas and a color filter, which are used in various kinds of electronic equipment, production processes thereof, and a liquid crystal display-device using the color filter.

2. Related Background Art

Liquid crystal display devices are generally installed in personal computers, word processors, car navigation systems, portable televisions, etc., and their demand has increased in recent years. With the development of market for the liquid crystal display devices, a color filter constructing the principal part of the display device is required to have good performance such as high definition, enlargement in size and high quality. In addition, a problem that its cost should be reduced is also imposed thereon.

The color filter for liquid crystal display device is constructed by repeatedly arranging, as pixels, a plurality of colored areas different in spectral characteristics from each other, generally, areas segmentally colored in red, green and yellow, on a transparent base. Processes for forming the colored areas which make up the pixels include a dyeing process, a pigment dispersing process, an electrodeposition process, a printing process and the like. In order to enhance display contrast, light-screening areas (for example, black matrices) are provided between the pixels.

The black matrices are usually formed by subjecting a deposited film or sputtered film of metallic chromium formed on the transparent base to an etching treatment to form a great number of apertures. In order to reduce the cost of the color filter and make the reflecting properties of the black matrices low, several processes for forming black matrices using a resin as new black matrices have been proposed.

When black matrices are formed with a resin, it is necessary to thicken a film of the resin for the purpose of achieving an optical density required of the black matrices. For this reason, there is a possibility that a difference in level may arise between light-screening areas to function as black matrices and apertures defined thereby, and so evenness required of a color filter for liquid crystal display device may not be maintained.

As a process for forming black matrices with a resin, by which this respect is improved, may be mentioned a process disclosed in Japanese Patent Application Laid-Open No. 6-265713. According to the process disclosed in Japanese Patent Application Laid-Open No. 6-265713, a transparent colorable layer is applied to a base, portions of the colorable layer, which will become black matrices, are exposed to ultraviolet rays to form portions to be dyed, and the base, on which the portions to be dyed have been formed, is dipped in a black ink to form the black matrices. However, it is necessary to control the film thickness of the transparent colorable layer to a film thickness exceeding 2.0 μm for the purpose of achieving a sufficient optical density because dip coating is used. When controlling to the film thickness exceeding 2.0 μm, however, there is a possibility that the resin layer may become liable to peel and crack upon a heating treatment in another process, thus leading to reduction in yield.

On the other hand, a color filter constructed by providing light-screening areas and colored areas on a transparent base also leaves room for improvement apart from this.

The color filter for liquid crystal display device is constructed by repeatedly arranging, as pixels, a plurality of colored areas different in spectral characteristics from each other, generally, areas segmentally colored in red, green and blue, on a transparent base. In order to enhance display contrast, light-screening areas called black matrices are provided between the pixels. The light-screening areas are usually formed by subjecting a deposited film or sputtered film of metallic chromium to an etching treatment to form a great number of apertures. On the other hand, processes for forming the colored areas which make up the pixels include a dyeing process, a pigment dispersing process, an electrodeposition process, a printing process and the like.

According to the dyeing process, a dyeable, water-soluble polymer such as casein, gelatin or PVA is applied to a base and dried, and the coating film thus formed is exposed to ultraviolet rays through a photomask, followed by development with water to obtain a relief pattern. This pattern is then colored with an acid dye or the like to obtain a colored pattern of a first color. This process is repeatedly performed three times to form a color filter composed of colored patterns of red, green and blue.

According to the pigment dispersing process, a layer of a photosensitive resin in which a pigment has been dispersed is formed on a base and then subjected to patterning, thereby obtaining a colored pattern of a first color. This process is repeatedly performed three times, thereby forming a color filter composed of colored patterns of red, green and blue.

According to the electrodeposition process, a transparent electrode is patterned on a base. The base is then immersed in an electrodeposition coating fluid containing a pigment, resin, electrolytic solution and the like to obtain a colored pattern of a first color. This process is repeatedly performed three times, thereby forming a color filter composed of colored patterns of red, green and blue.

According to the printing process, three coatings of red, green and blue colors, each comprising a thermosetting resin and a pigment dispersed therein, are separately applied by repeated printing, and the resin to become each colored layer is then thermoset to form a color filter.

The need of repeating the same process three times to form the colored patterns of red, green and blue is common to these processes. Therefore, the number of processes necessarily increases to increase the production cost.

As processes for improving this drawback, processes for producing a color filter by using an ink-jet system are disclosed in Japanese Patent Application Laid-Open Nos. 61-245106 and 1-217302, etc.

Japanese Patent Application Laid-Open No. 61-245106 describes a process for producing a color filter, wherein a coloring layer is formed on a base, black matrices of a black color are formed thereon, inks are separately applied to apertures defined by the black matrices by an ink-jet system to color those portions in three colors of red, green and blue. Japanese Patent Application Laid-Open No. 1-217302 describes a process for producing a color filter, wherein black matrices are formed with a resin on a base, a coloring layer is applied onto the black matrix layer, and portions of the coloring layer, which correspond to apertures defined by the black matrices, are colored in three colors of red, green and blue by an ink-jet system. However, these processes are relatively difficult to prevent color mixing between adjacent colored portions of different colors, blank areas and color irregularity, so that a fully satisfactory color filter is not always provided under the circumstances.

SUMMARY OF THE INVENTION

The present invention has been made with the foregoing circumstances in view. It is a first object of the present invention to provide a substrate in which light-screening areas are formed with a resin having a high optical density to a film thickness thin sufficiently not to impair evenness required of a color filter for liquid crystal display device, and a production process thereof.

A second object of the present invention is to provide a process for cheaply producing a color filter, by which light-screening areas and colored areas can be formed by similar processes without causing color mixing, blank areas and color irregularities while satisfying required properties met by the conventional processes, such as heat resistance, solvent resistance and resolution, a color filter produced by this production process and a liquid crystal display device equipped with the color filter.

The present invention, which will be described subsequently, can achieve the above objects and solve the problems to be solved as described above.

According to the present invention, there is thus provided a substrate having light-screening areas, wherein a resin layer having a thickness of at most 2.0 μm, in which numbers of transparent areas and light-screening areas formed with ink dots at margins of the transparent areas are arranged, is formed on a transparent base.

According to the present invention, there is also provided a process for producing a substrate having light-screening areas, wherein a resin layer having a thickness of at most 2.0 μm, in which numbers of transparent areas and light-screening areas formed with ink dots at margins of the transparent areas are arranged, is formed on a transparent base, which process comprises the steps of:

(1) forming a resin layer of at most 2.0 μm in thickness, which is capable of setting by light irradiation or light irradiation and heating and is ink-receptive, on the transparent base;

(2) setting portions of the resin layer, at which the transparent areas will be formed, by light irradiation or light irradiation and heating;

(3) applying an ink, by which the light-screening areas are formed, to unset portions of the resin layer, at which the light-screening areas will be formed, by an ink-jet system; and (4) setting the colored portions of the resin layer by light irradiation or light irradiation and heating.

According to the present invention, there is further provided a color filter comprising a transparent base, and a light-screening resin layer, in which numbers of transparent areas and light-screening areas formed at margins of the transparent areas are arranged, and a filter resin layer, in which a plurality of transparent colored areas different in spectral characteristics from each other is repeatedly arranged in opposed relation to the transparent areas of the light-screening resin layer, successively formed on the transparent base.

The present invention also includes two aspects of a process for producing a color filter.

In a first aspect of the process for producing a color filter according to the present invention, there is thus provided a process for producing a color filter comprising a transparent base on which light-screening areas and a plurality of transparent colored areas different in spectral characteristics from each other are selectively arranged, which process comprises the steps of:

(1) forming a light-screening resin layer by forming a resin layer, which is capable of setting by light irradiation or light irradiation and heating and is ink-receptive, on the transparent base, setting portions of the resin layer by light irradiation or light irradiation and heating, applying an ink, by which the light-screening areas are formed, to unset portions of the resin layer, and then setting the colored potions of the resin layer by light irradiation or light irradiation and heating; and (2) forming a filter resin layer by forming a resin layer, which is capable of setting by light irradiation or light irradiation and heating and is ink-receptive, on the light-screening resin layer, setting portions of the resin layer by light irradiation or light irradiation and heating, segmentally applying plural color inks different in spectral characteristics from each other to unset portions of the resin layer, and then setting the colored portions of the resin layer by light irradiation or light irradiation and heating.

In a second aspect of the process for producing a color filter according to the present invention, there is also provided a process for producing a color filter comprising a transparent base on which light-screening areas and a plurality of transparent colored areas different in spectral characteristics from each other are selectively arranged, which process comprises the steps of:

(1) forming a filter resin layer by forming a resin layer, which is capable of setting by light irradiation or light irradiation and heating and is ink-receptive, on the transparent base, setting portions of the resin layer by light irradiation or light irradiation and heating, segmentally applying plural color inks different in spectral characteristics from each other to unset portions of the resin layer, and then setting the colored portions of the resin layer by light irradiation or light irradiation and heating; and (2) forming a light-screening resin layer by forming a resin layer, which is capable of setting by light irradiation or light irradiation and heating and is ink-receptive, on the filter resin layer, setting portions of the resin layer by light irradiation or light irradiation and heating, applying an ink, by which the light-screening areas are formed, to unset portions of the resin layer, and then setting the colored portions of the resin layer by light irradiation or light irradiation and heating.

The present invention further includes a liquid crystal display device.

According to the present invention, there is thus provided a liquid crystal display device comprising a first substrate in which the color filter according to the present invention is provided, a second substrate in which pixel electrodes are arranged, and a liquid crystal material enclosed in a space between both substrates.

According to the substrate having light-screening areas of the present invention, the light-screening areas can be formed with a resin having a high optical density to a film thickness thin sufficiently not to impair evenness required of a color filter for liquid crystal display device. According to the production process of a substrate having light-screening areas of the present invention, the substrate can be produced through simple steps. Therefore, the production cost can be reduced.

According to the production process of a color filter of the present invention, a color filter free of defects such as color mixing, blank areas and color irregularities and hence high in reliability can be provided. A liquid crystal display device equipped with this filter can display excellent images. In addition, according to the production process of a color filter of the present invention, the light-screening layer and the colored layer can be formed by similar steps, so that the production cost can be reduced to permit the provision of a cheap color filter.

BRIEF DESCRIPTION OF THE DRAWINGS

FIGS. 4A and 4B are cross-sectional views illustrating the construction of color filters according to embodiments of the present invention.

FIG. 5 schematically illustrates the construction of a liquid crystal display device according to an embodiment of the present invention.

DESCRIPTION OF THE PREFERRED EMBODIMENTS

The present invention will hereinafter be described in detail by reference to the drawings. FIGS. 1A through 1D illustrate a production process of a substrate having light-screening areas according to an embodiment of the present invention. The construction thereof is illustrated taking black matrices as an example of the light-screening areas.

A transparent base is preferred as a base used in the present invention, and a glass base is generally used. However, the base is not limited to the glass base so far as it has properties required of color filters for liquid crystal display device, such as transparency and mechanical strength.

Figure 1A:
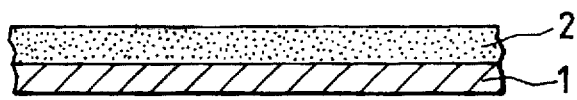
FIGS. 1A through 1D are flow sheets illustrating a production process of a substrate having light-screening areas according to an embodiment of the present invention.

FIG. 1A illustrates a state that a resin composition, which is capable of setting by light irradiation or light irradiation and heating and is ink-receptive, has been applied onto a base 1, and prebaked, as needed, to form a resin layer 2.

The resin layer 2 has a dry film thickness of at most 2.0 µm, preferably at most 1.8 µm.

As the resin composition capable of setting used in the present invention, any resin composition may be used so far as it is ink-receptive and set by light irradiation or light irradiation and heating. Examples of the resin contained in the composition include acrylic resins, epoxy resins, silicone resins, cellulose derivatives such as hydroxypropylcellulose, hydroxyethylcellulose, methylcellulose and carboxymethylcellulose or modified products thereof, etc. However, the acrylic resins are preferred with acrylic copolymer resins being particularly preferred. Those obtained by copolymerizing one or more of monomers such as acrylic acid, methyl acrylate, ethyl acrylate, hydroxyethyl methacrylate, N-methylolacrylamide and N-ethoxymethylacrylamide are preferred as the acrylic copolymer resins. The proportion of these monomers to be incorporated is preferably from 5 to 95 mole % based on the resin.

As a process for applying the resin composition onto the base, any of various coating processes such as roll coating, spin coating and dip coating may be used without any particular limitation.

Figure 1B:
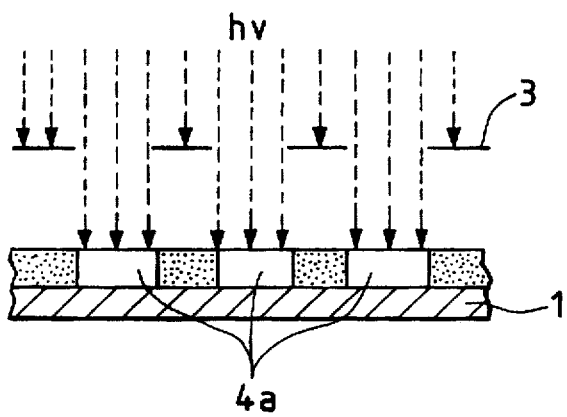
Figure 1C:
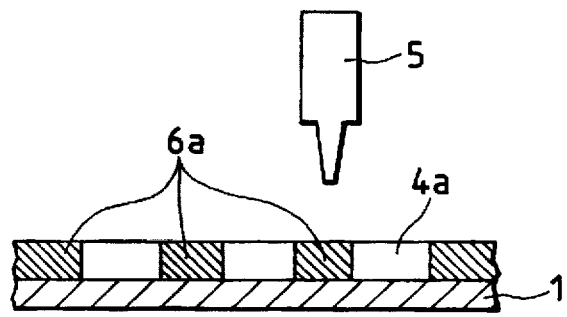
Figure 1D:
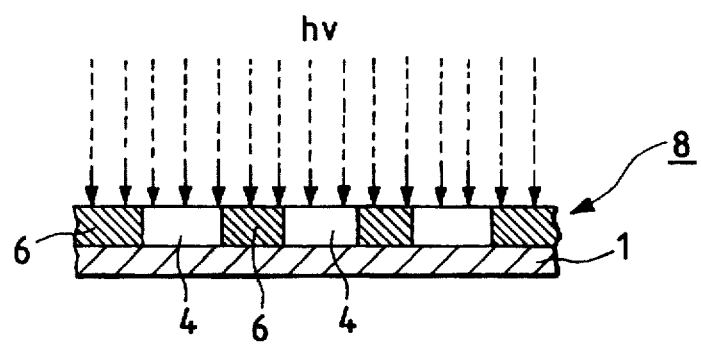

Portions (portions 4a which will become transparent areas) of the resin layer 2 other than areas which will become light-screening areas in the black matrices are then subjected to patterning exposure using a photomask 3 (FIG. 1B). Thereafter, the portions 6a which will become the light-screening areas 6 in the black matrices are colored with, for example, a black ink (FIG. 1C). Although the ink, by which the light-screening areas are formed, is not necessarily black, it is desirable that the ink should absorb light. Finally, the portions 6a which will become the light-screening areas are set by light irradiation or light irradiation and heating, as needed, to form the light-screening areas 6 (FIG. 1D). The coloring of the portions 6a is performed using an ink-jet system. Incidentally, reference numeral 5 in FIG. 1C designates an ink-jet head.

By the above-described steps, a black matrix substrate 8, wherein the resin layer 2, in which numbers of the transparent areas 4 and the light-screening areas 6 formed at margins of the transparent areas are arranged, is formed on the base 1, is obtained.

The ink-jet system has the following merits unlike the dip coating.

(1) Since, for example, a black ink can be directly applied at a high concentration to color the desired portions, the film thickness of the resin layer may be reduced.

(2) Since the solids in a part of the black ink, which has not been able to be absorbed in the resin layer, are crystallized on the resin layer, the light-screening ability can be enhanced making good use of this phenomenon.

(3) The optical density within each of the black matrices can be gradated, for example, by adjusting only the optical density of a region which will come into contact with a thin film transistor.

In each of the black matrices, the optical density of the light-screening area may be even. However, the optical density of the light-screening area in the black matrix may be partially varied to gradate it. In this case, the optical density may be varied continuously or intermittently.

Figure 2A:
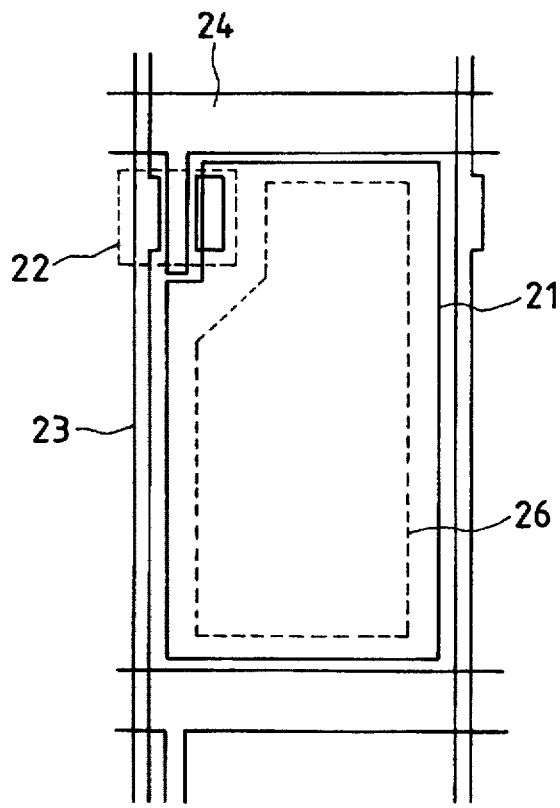
FIG. 2A is an enlarged fragmentary view of a display electrode part.

FIG. 2A is an enlarged fragmentary view of a display electrode part of a liquid crystal display device. A pixel is constructed by putting the black matrix to overlap the electrode part.

In FIG. 2A, reference numerals 21, 22, 23 and 24 designate a display electrode, a thin film transistor (TFT), a signal wiring and a gate wiring, respectively.

Figure 2B:
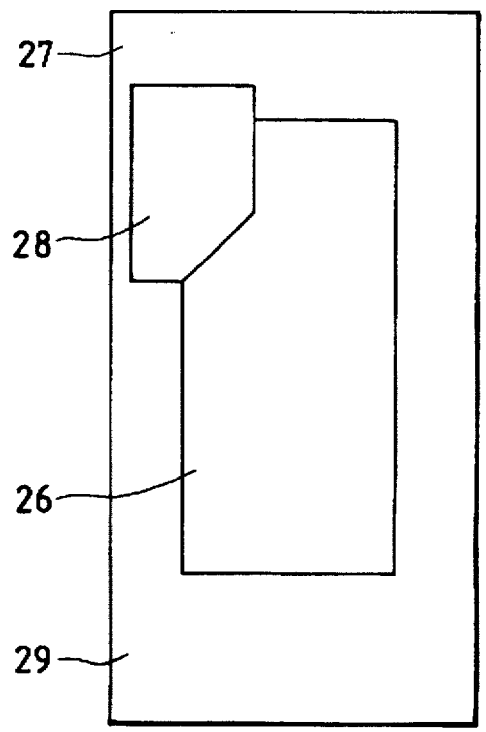
FIG. 2B is an enlarged fragmentary view illustrating a light-screening area according to an embodiment of the present invention for overlapping the electrode part shown in in FIG. 2A.

FIG. 2B is an enlarged fragmentary view illustrating a black matrix for overlapping the display electrode part shown in FIG. 2A. The black matrix is constructed by forming a light-screening area 27 formed with ink dots at margins of a transparent area 26 (a transparent area within the black matrix). The light-screening area 27 is formed with gradation of varied optical density (varied light-screening degree) as illustrated by a high-optical density part 28 and a low-optical density part 29.

When the black matrix is put to overlap the display electrode part, the high-optical density part 28 completely covers TFT 22 to form a light-screening layer having an optical density required on TFT 22, thereby exhibiting an excellent light-screening effect.

In order to provide a gradation to the black matrix, there are a method of changing the concentration of coloring matter in an ink-jet ink, a method of changing a dot density, and the like.

Incidentally, the other construction of the black matrix substrate is as described above.

The color filter according to the present invention will now be described by reference to the drawings.

FIGS. 3A through 3H show flow sheets illustrating a production process of a color filter according to the present invention and illustrate an example of the construction of the color filter according to the present invention.

A transparent base is preferred as a base used in the present invention, and a glass base is generally used. However, the base is not limited to the glass base so far as it has properties required of color filters for liquid crystal display device, such as transparency and mechanical strength.

Figure 3A:
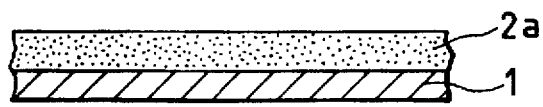
FIGS. 3A through 3H are flow sheets illustrating a production process of a color filter according to an embodiment of the present invention.

FIG. 3A illustrates a state that a resin composition, which is capable of setting by light irradiation or light irradiation and heating and is ink-receptive, has been applied onto a base 1, and prebaked, as needed, to form a resin layer 2a. As a process for applying the resin composition onto the base, any of spin coating, roll coating, dip coating and the like may be used without any particular limitation.

Figure 3B:
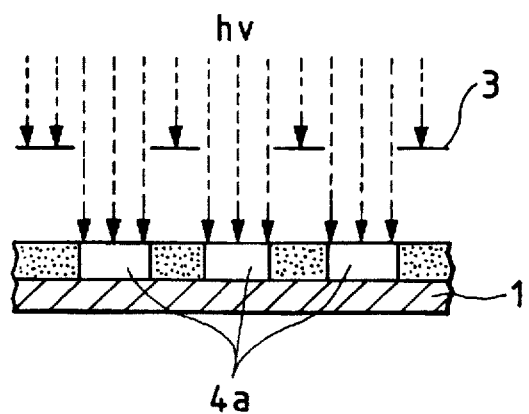
Figure 3C:
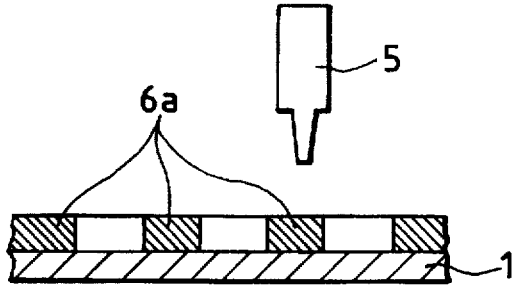
Figure 3D:
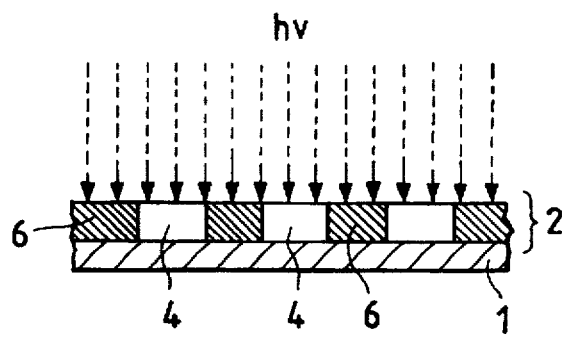
Figure 3E:
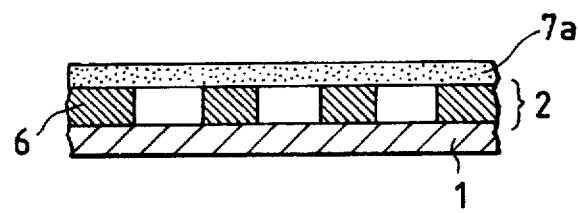

Portions (portions 4a which will become transparent areas) of the resin layer 2a other than areas which will become light-screening areas are then subjected to patterning exposure using a photomask 3 (FIG. 3B). Thereafter, portions 6a which will become the light-screening areas 6 are colored with an ink capable of absorbing light, for example, a black ink (FIG. 3C). An ink-jet system is preferred as a method of the coloring, but spin coating, roll coating, dip coating or the like may also be used. Incidentally, reference numeral 5 in FIG. 3C designates an ink-jet head. The colored portions are set by light irradiation or light irradiation and heating, as needed, to form the light-screening areas 6 (FIG. 3D).

Figure 3F:
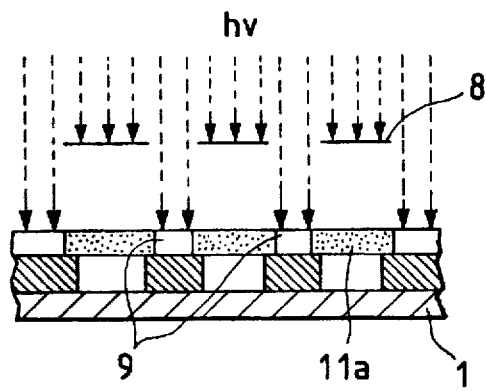
Figure 3G:
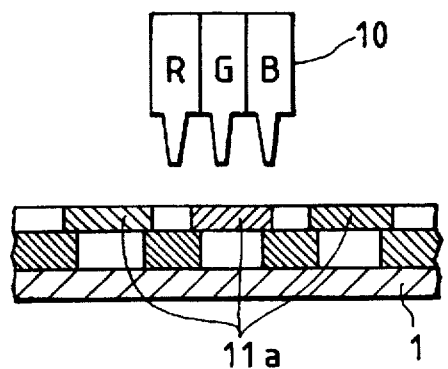
Figure 3H:
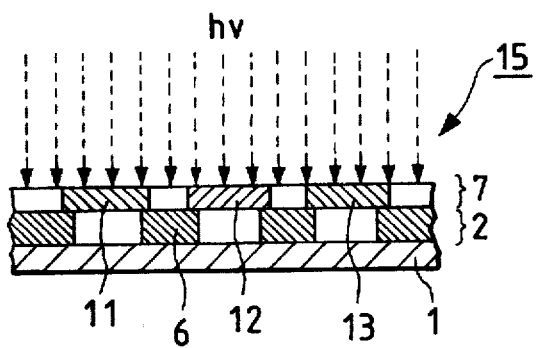

By the above-described steps, a light-screening resin layer 2, wherein numbers of the transparent areas 4 and the light-screening areas 6 formed at margins of the transparent areas are arranged, is obtained. Further, a resin composition, which is capable of setting by light irradiation or light irradiation and heating and is ink-receptive, is applied onto the thus-formed light-screening resin layer 2 including the light-screening areas 6 to form a resin layer 7a (FIG. 3E), followed by patterning exposure using a photomask 8 (FIG. 3F). Thereafter, plural color inks 10 different in spectral characteristics from each other are segmentally applied to portions 11a to be colored by an ink-jet system (FIG. 3G), and the thus-colored portions are set by light irradiation or light irradiation and heating, as needed, to form a filter resin layer 7 wherein a plurality of transparent colored areas 11, 12 and 13 different in spectral characteristics from each other is repeatedly arranged, thereby obtaining a color filter 15 (FIG. 3H). Incidentally, reference numeral 9 indicates an uncolored area.

In FIG. 3H, the three colored areas 11, 12 and 13 are illustrated as a plurality of the transparent colored areas. However, the transparent colored areas are not limited thereto, and any desired kinds of colored areas may be repeatedly arranged.

Each of the colored areas 11, 12 and 13 formed in the filter resin layer 7 is desirably formed so as to cover the transparent area 4 of the light-screening resin layer 2 and further the vicinity of its margin. Namely, the colored area 11 is preferably formed to overlap with the light-screening areas 6. This construction ensures that the occurrence of color mixing and blank areas can be prevented. The overlap width between the light-screening area 6 and the colored area 11, 12 or 13 is controlled to about 20 to 60%, in particular, preferably 30 to 50% of the width of the light-screening area 6. In the above explanation, the structure that the light-screening resin layer is formed as the first layer on the glass base, and the filter resin layer is formed as the second layer (see FIG. 4A) has been described. However, as illustrated in FIG. 4B, a structure that the filter resin layer is formed as the first layer on the glass base, and the light-screening resin layer is formed as the second layer may be permissible. Incidentally, reference numerals in FIGS. 4A and 4B have the same meaning as like reference numerals in FIGS. 3A to 3H.

As the resin composition capable of setting used in the present invention, any resin composition may be used so far as it is ink-receptive and set by light irradiation or light irradiation and heating. Examples of the resin contained in the composition include acrylic resins, epoxy resins, silicone resins, cellulose derivatives such as hydroxypropylcellulose, hydroxyethylcellulose, methylcellulose and carboxymethylcellulose or modified products thereof, etc.

A liquid crystal display device equipped with the color filter according to the present invention will now be described by reference to FIG. 5. FIG. 5 typically illustrates the liquid crystal display device according to an embodiment of the present invention. In FIG. 5, reference numeral 100 indicates the color filter according to the present invention. A protective film 45, a common electrode 46 and an orientation film 47 are laminated on the color filter 100 to construct a first substrate. Reference numeral 51 designates a transparent base. Pixel electrodes 50 and an orientation film 49 are arranged on the base 51 to construct a second substrate. A liquid crystal material 48 is enclosed in a space between both substrates. Reference numerals 41 and 52, and 53 indicate polarizing plates, and back light, respectively.

In the liquid crystal display device illustrated in FIG. 5, the pixel electrodes 50 are formed in a matrix form on the base opposite to the color filter 100 through the liquid crystal material 48. Coloring materials of, for example, red, green and blue colors, which make up the color filter, are arranged at positions opposite to the pixel electrodes 50.

The present invention will hereinafter be described more specifically by the following Examples. However, the present invention is not limited to or by these examples.

EXAMPLE 1

A photosensitive resin composition comprising an acrylic terpolymer having the following composition was applied onto a surface-polished non-alkali glass sheet, thereby forming a resin layer. More specifically, the photosensitive resin composition was applied by a spin coater and then baked at 90° C. for 20 minutes, thereby forming a photosensitive resin layer having a film thickness of 1 μm.

| Photosensitive resin composition: | |
| --- | --- |
| Terpolymer composed of methyl methacrylate, hydroxyethyl methacrylate and N-methylolacrylamide (compositional ratio by weight of the monomers = 2:3:5) having an average molecular weight of about 20,000 | 10 parts by weight |
| Triphenylsulfonium hexafluoroantimonate | 0.3 part by weight |
| Ethyl cellosolve | 89.7 parts by weight. |

The photosensitive resin layer was partially exposed through a photomask so as to expose portions of the resin layer other than portions at which black matrices were to be formed, followed by a heat treatment for 1 minute at 120° C. on a hot plate, thereby partially conducting a setting treatment on the photosensitive resin layer. Unset portions of the photosensitive resin layer were colored with a black ink having the following composition by an ink-jet system, and the colored resin layer was baked at 90° C. for 20 minutes and at 200° C. for 60 minutes, thereby forming a pattern of black matrices colored in black.

| Composition of black ink: | |
|---|---|
| Carbon black (MCF-88, trade name, product of Mitsubishi Chemical Industries Ltd.) | 5 parts by weight |
| Polyvinyl pyrrolidone | 0.8 part by weight |
| Ethylene glycol | 10 parts by weight |
| Isopropyl alcohol | 3 parts by weight |
| Glycerol | 5 parts by weight |
| Water | 76.2 parts by weight. |

Polyvinyl pyrrolidone used in this ink performs a function as a dispersant for carbon black which is a black pigment.

The black matrix substrate thus formed was used to produce a color filter. As a result, the color filter exhibited excellent evenness, and a liquid crystal display device making use of this color filter showed excellent display contrast.

EXAMPLE 2

A photosensitive resin composition comprising an acrylic terpolymer having a composition shown in Table 1 was applied onto a surface-polished non-alkali glass sheet, thereby forming a first resin layer. More specifically, the photosensitive resin composition was applied by a spin coater and then baked at 90° C. for 20 minutes, thereby forming a photosensitive resin layer having a film thickness of 2 µm.

TABLE 1

| Photosensitive resin composition | |
|---|---|
| Prepolymer* | 10 parts by weight |
| Triphenylsulfonium hexafluoro-antimonate | 0.3 part by weight |
| Ethyl cellosolve | 89.7 parts by weight. |

*Terpolymer composed of methyl methacrylate, hydroxyethyl methacrylate and N-methylolacrylamide (compositional ratio by weight = 2:3:5) having an average molecular weight of about 20,000

The photosensitive resin layer was then partially exposed through a photomask so as to expose portions of the resin layer other than portions at which black matrices were to be formed, followed by a heat treatment for 1 minute at 120° C. on a hot plate, thereby partially conducting a setting treatment on the photosensitive resin layer. Unset portions of the photosensitive resin layer were colored with a black ink having its corresponding composition shown in Table 2 by an ink-jet system, and the colored resin layer was baked at 90° C. for 20 minutes and at 200° C. for 60 minutes, thereby forming a resin layer having light-screening areas colored in black. A second photosensitive resin layer having a film thickness of 1 µm was formed on the first resin layer in the same manner as described above. The second photosensitive resin layer was then subjected to patterning exposure through a photomask so as to expose portions of the resin layer other than portions at which pixels, i.e., transparent colored areas were to be formed, followed by partial setting of the second photosensitive resin layer. Color inks of red, green and blue colors, which had been prepared in accordance with their corresponding compositions shown in Table 2, were segmentally applied to unset portions of the second photosensitive resin layer by an ink-jet system. After the coloring, the colored resin layer was baked at 90° C. for 20 minutes and at 200° C. for 60 minutes, thereby forming a pattern of a color filter segmentally colored in red, green and blue. In this example, a width between the shorter sides of the transparent area in the light-screening resin layer was 65 µm, and a width between the shorter sides of the transparent colored area in the filter resin layer was 85 µm. Therefore, the transparent colored area was formed so as to cover a part of the light-screening areas with its margin part. Incidentally, the pitch width of the transparent colored area was adjusted to 100 µm. None of color mixing, blank areas and color irregularity were recognized on the color filter thus produced. This color filter was used to produce a liquid crystal display device. As a result, high-definition color images were able to be displayed.

TABLE 2

| Composition of color ink | |
|---|---|
| Black ink: | |
| Black dye*1 | 10 parts by weight |
| Diethylene glycol | 10 parts by weight |
| 1,1-Dimethylurea | 3 parts by weight |
| Water | 77 parts by weight |
| Red ink: | |
| Red dye*2 | 4.5 parts by weight |
| Ethylene glycol | 20 parts by weight |
| Isopropyl alcohol | 5 parts by weight |
| Water | 70.5 parts by weight |
| Green ink: | |
| Green dye*3 | 4.1 parts by weight |
| Ethylene glycol | 20 parts by weight |
| Isopropyl alcohol | 5 parts by weight |
| Water | 70.9 parts by weight |
| Blue ink: | |
| Blue dye *4 | 5 parts by weight |
| Ethylene glycol | 20 parts by weight |
| Isopropyl alcohol | 5 parts by weight |
| Water | 70 parts by weight |

*1C.I. Direct Black 154.
*2A 11:3 mixture of C.I. Acid Red 35 and C.I. Acid Yellow 23.
*3A 11:3 mixture of C.I. Acid Blue 9 and C.I. Acid Yellow 23.
*4A 11:3 mixture of C.I. Acid Blue 9 and C.I. Acid Red 35.

EXAMPLE 3

A filter resin layer segmentally colored in red, green and blue and a light-screening resin layer partially colored in black were formed on a glass base in the same manner as in Example 2 except that the formation of the first and second layers were reversed.

None of color mixing, blank areas and color irregularity were recognized on the color filter thus produced. This color filter was used to produce a liquid crystal display device. As a result, high-definition color images were able to be displayed.

EXAMPLE 4

Color filters were produced in the same manner as in Examples 2 and 3 except that the coloring with the black ink was performed by spin coating.

None of color mixing, blank areas and color irregularity were recognized on the color filters thus produced. These color filters were separately used to produce liquid crystal display devices. As a result, high-definition color images were able to be displayed.

EXAMPLE 5

Color filters were produced in the same manner as in Examples 2 and 3 except that the coloring with the black ink was performed by roll coating.

None of color mixing, blank areas and color irregularity were recognized on the color filters thus produced. These color filters were separately used to produce liquid crystal display devices. As a result, high-definition color images were able to be displayed.

EXAMPLE 6

Color filters were produced in the same manner as in Examples 2 and 3 except that the coloring with the black ink was performed by dip coating.

None of color mixing, blank areas and color irregularity were recognized on the color filters thus produced. These color filters were separately used to produce liquid crystal display devices. As a result, high-definition color images were able to be displayed.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A process for producing a substrate having light-screening areas, wherein a resin layer having a thickness of at most 2.0 µm, in which numbers of transparent areas and light-screening areas formed with ink dots at margins of the transparent areas are arranged, is formed on a transparent base, which process comprises the steps of:

(1) forming a resin layer of at most 2.0 µm in thickness, which is capable of setting by light irradiation or light irradiation and heating and is ink-receptive, on the transparent base;

(2) setting portions of the resin layer, at which the transparent areas will be formed, by light irradiation or light irradiation and heating;

(3) applying an ink, by which the light-screening areas are formed, to unset portions of the resin layer, at which the light-screening areas will be formed, by an ink-jet system; and (4) setting the colored portions of the resin layer by light irradiation or light irradiation and heating.

2. A color filter comprising a transparent base, and a light-screening resin layer, in which numbers of transparent areas and light-screening areas formed at margins of the transparent areas are arranged, and a filter resin layer, in which a plurality of transparent colored areas different in spectral characteristics from each other is repeatedly arranged in opposed relation to the transparent areas of the light-screening resin layer, successively formed on the transparent base.

3. The color filter according to claim 2, wherein the light-screening areas are formed having a gradation of optical density.

4. The color filter according to claim 2, wherein each of the transparent colored areas is formed so as to cover the transparent area of the light-screening resin layer and the vicinity of its margin.

5. A process for producing a color filter comprising a transparent base on which light-screening areas and a plurality of transparent colored areas different in spectral characteristics from each other are selectively arranged, which process comprises the steps of:

(1) forming a light-screening resin layer by forming a resin layer, which is capable of setting by light irradiation or light irradiation and heating and is ink-receptive, on the transparent base, setting portions of the resin layer by light irradiation or light irradiation and heating, applying an ink, by which the light-screening areas are formed, to unset portions of the resin layer, and then setting the colored portions of the resin layer by light irradiation or light irradiation and heating; and (2) forming a filter resin layer by forming a resin layer, which is capable of setting by light irradiation or light irradiation and heating and is ink-receptive, on the light-screening resin layer, setting portions of the resin layer by light irradiation or light irradiation and heating, segmentally applying plural color inks different in spectral characteristics from each other to unset portions of the resin layer, and then setting the colored portions of the resin layer by light irradiation or light irradiation and heating.

6. A process for producing a color filter comprising a transparent base on which light-screening areas and a plurality of transparent colored areas different in spectral characteristics from each other are selectively arranged, which process comprises the steps of:

(1) forming a filter resin layer by forming a resin layer, which is capable of setting by light irradiation or light irradiation and heating and is ink-receptive, on the transparent base, setting portions of the resin layer by light irradiation or light irradiation and heating, segmentally applying plural color inks different in spectral characteristics from each other to unset portions of the resin layer, and then setting the colored portions of the resin layer by light irradiation or light irradiation and heating; and (2) forming a light-screening resin layer by forming a resin layer, which is capable of setting by light irradiation or light irradiation and heating and is ink-receptive, on the filter resin layer, setting portions of the resin layer by light irradiation or light irradiation and heating, applying an ink, by which the light-screening areas are formed, to unset portions of the resin layer, and then setting the colored portions of the resin layer by light irradiation or light irradiation and heating.

7. The process according to claim 5 or 6, wherein the ink, by which the light-screening areas are formed, is an ink which absorbs light.

8. The process according to claim 7, wherein the ink, by which the light-screening area are formed, is black.

9. The process according to claim 5 or 6, wherein the ink, by which the light-screening areas are formed, is applied by an ink-jet system.

10. The process according to claim 5 or 6, wherein the ink, by which the light-screening areas are formed, is applied by spin coating.

11. The process according to claim 5 or 6, wherein the ink, by which the light-screening areas are formed, is applied by roll coating.

12. The process according to claim 5 or 6, wherein the ink, by which the light-screening areas are formed, is applied by dip coating.

13. A liquid crystal display device comprising a first substrate in which the color filter according to claim 2 is provided, a second substrate in which pixel electrodes are arranged, and a liquid crystal material enclosed in a space between both substrates.

* * * * *

UNITED STATES PATENT AND TRADEMARK OFFICE
CERTIFICATE OF CORRECTION

PATENT NO. : 5,736,278
DATED : April 7, 1998
INVENTOR(S) : KOICHIRO NAKAZAWA ET AL.

It is certified that error appears in the above-identified patent and that said Letters Patent is hereby corrected as shown below:

COLUMN 1

Line 9, "display-device" should read --display device--.

COLUMN 3

Line 3, "thin sufficiently" should read
        --sufficiently thin--.

COLUMN 4

Line 52, "thin sufficiently" should read
        --sufficiently thin--.

COLUMN 7

Line 58, "areas" should read --area--.

COLUMN 12

Line 49, "area" should read --areas--.

Signed and Sealed this

Twentieth Day of October, 1998

Attest:

BRUCE LEHMAN

Attesting Officer     Commissioner of Patents and Trademarks